Feb. 3, 1970  C. G. TRIGGS  3,493,265
SIDE DISCHARGE WAGON BOX ASSEMBLY
Filed March 19, 1968  3 Sheets-Sheet 1

INVENTOR.
CLARENCE G. TRIGGS
BY *Rudolph L. Lowell*
ATTORNEY.

Feb. 3, 1970
C. G. TRIGGS
3,493,265
SIDE DISCHARGE WAGON BOX ASSEMBLY
Filed March 19, 1968
3 Sheets-Sheet 2
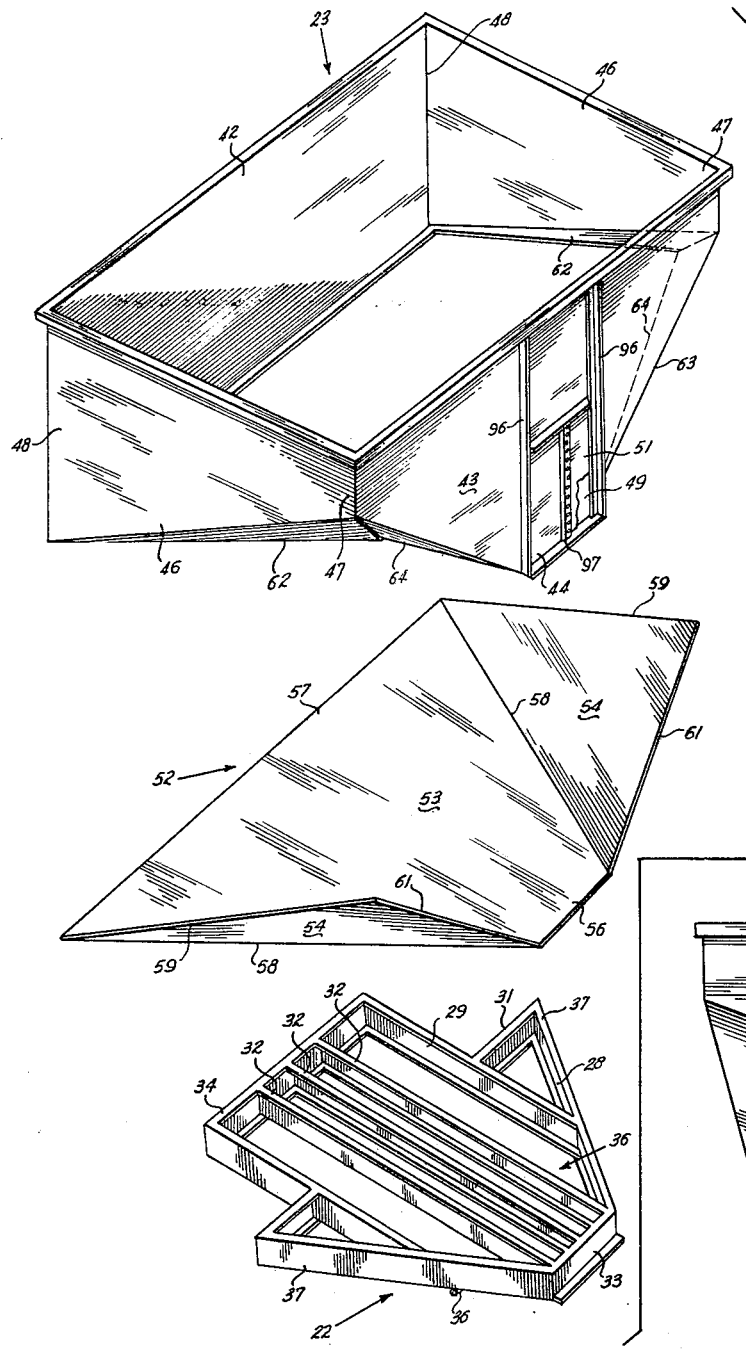
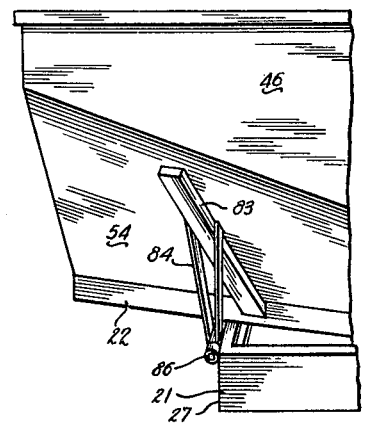
INVENTOR.
CLARENCE G. TRIGGS
BY
ATTORNEY.

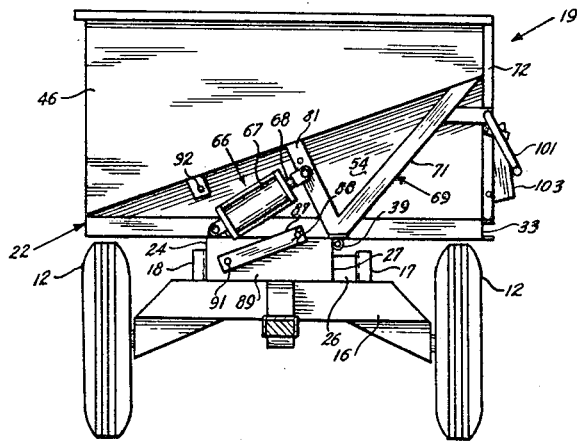
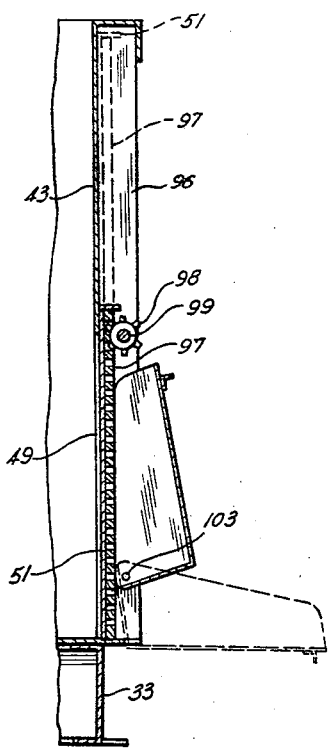
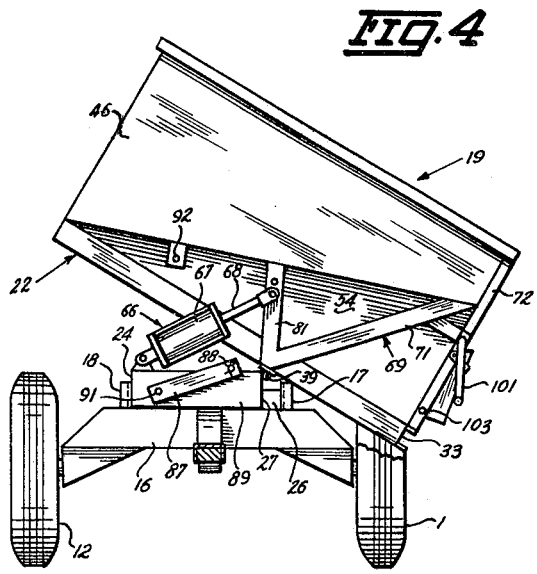

United States Patent Office 3,493,265
Patented Feb. 3, 1970

3,493,265
SIDE DISCHARGE WAGON BOX ASSEMBLY
Clarence G. Triggs, R.R. 2, Belmond, Iowa 50421
Filed Mar. 19, 1968, Ser. No. 714,241
Int. Cl. B60p 1/16; B65g 67/30
U.S. Cl. 298—18                               4 Claims

ABSTRACT OF THE DISCLOSURE

The side discharge wagon box assembly is adapted for assembly with a usual farm wagon chassis equipped with pairs of front and rear ground engaging wheels. This assembly includes a base frame supported on and extended longitudinally of the wagon chassis, a mounting frame pivotally supported on the base frame for transverse tilting movement, and a wagon box carried on the mounting frame. The dump box is of a rectangular shape longitudinally of the base frame. A bottom wall for the dump box includes a horizontal body portion integrally formed with upturned front and rear end portions of a triangular shape. The base sides of these upturned end portions are arranged in a converged relation toward one side of the bottom wall starting from the terminal ends of the opposite side of the bottom wall. This converged relation is at an angle such that the apices of the upturned triangular end portions are at the terminal ends of the one side of the bottom wall and define the corners of the wagon box corresponding to such terminal ends. Wall members project upwardly from the four sides of the bottom wall, with the wall member at the one side of the body member being formed at its lower end with a discharge opening located between the base sides of the upturned triangular end portions. In a loading position of the wagon box the body portion of the bottom wall is horizontally extended. In an unloading position the wagon box is tilted downwardly so that the body portion of the bottom wall is inclined downwardly toward the discharge opening. By virtue of the configuration and inclination of the upturned end portions of the bottom wall and their assembly relation with the upright wall members, the bottom wall, in a tilted position of the wagon box, functions as a chute relative to the discharge opening to provide for a complete unloading of material from the wagon box.

SUMMARY OF THE INVENTION

The side discharge wagon box assembly of this invention includes a wagon box which provides for a high capacity loading with complete stabilization against side tipping when the wagon is traveling on a sloped or inclined ground surface. By virtue of the pivotal support of the wagon box for transverse tilting movement about a longitudinal axis located adjacent one side of the base frame of the box assembly and the novel construction and assembly of the bottom wall relative to the discharge opening in one of the box side walls, a pivoted movement of the box from a loaded horizontal position to an unloading position tilted downwardly from the one side of the base frame provides for the complete discharge of all material from the box through the discharge opening. Successive quick tilting movements of the box to dislodge material therefrom following its initial tilting movement are thus entirely eliminated. Additionally, the pivotal support of the box relative to the base frame permits the use of a short stroke tilting cylinder of a type now in general use on farm implements. Further, the construction of the box supporting or mounting frame and its relative assembly with the box provides for the use of a single tilting or unloading cylinder without the setting up of any appreciable twisting or torsional stress in the mounting frame or in the wagon box.

DETAILED DESCRIPTION OF THE INVENTION

Further objects, features and advantages of the invention will become apparent from the following description when taken in connection with the accompanying drawing in which:

FIG. 2 is an exploded perspective view of the wagon box and the mounting frame therefor;

FIG. 3 is a front view of the wagon showing the wagon box in a horizontal loading position;

FIG. 4 is illustrated similarly to FIG. 3 and shows the wagon box in a tilted unloading position;

FIG. 5 is a detail perspective view of the pivot support for the rear end of the wagon box; and FIG. 6 is an enlarged sectional detail view taken along the line 6—6 in FIG. 1 showing the door or cover assembly for the wagon box discharge opening.

Figure 1:
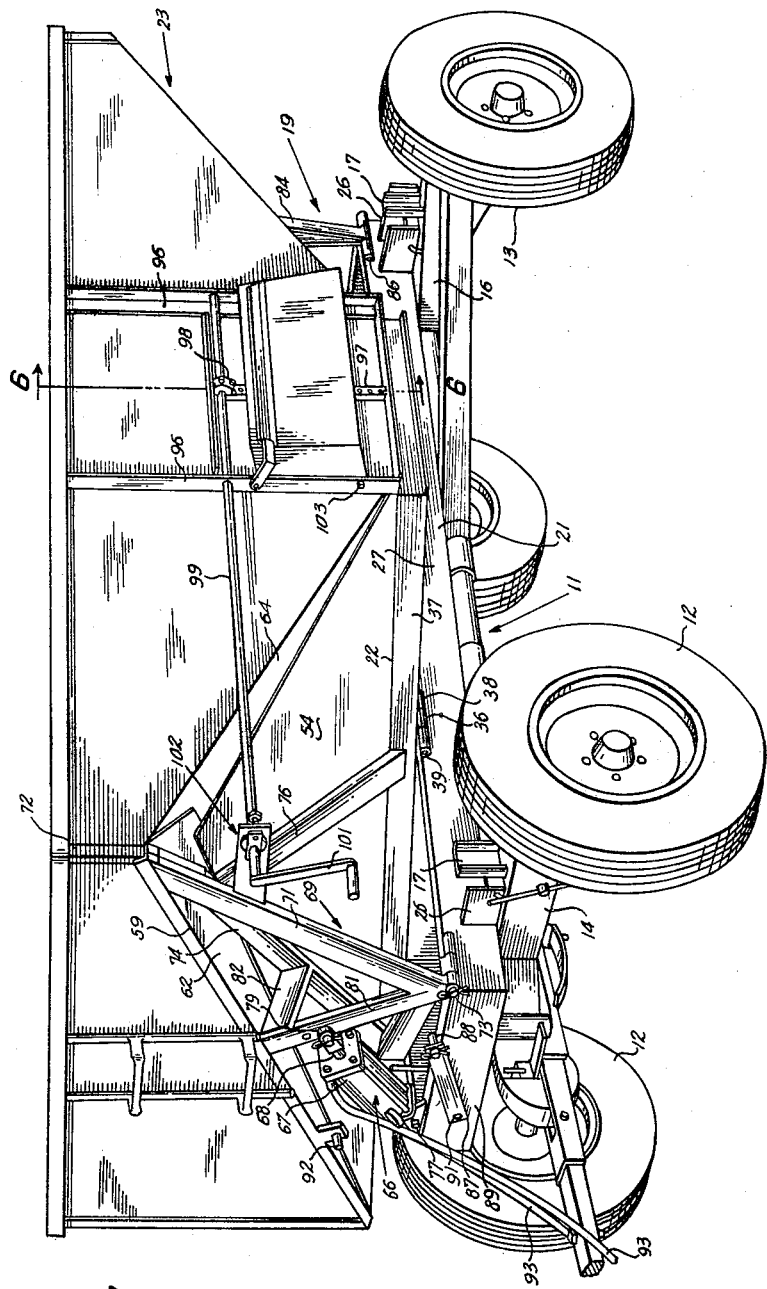
FIG. 1 is a front perspective view of the side discharge wagon box assembly of this invention.

Referring to the drawing there is illustrated in FIG. 1 a usual farm wagon chassis 11 that is equipped with front steering wheels 12, rear wheels 13 and front and rear bolsters 14 and 16, respectively, each of which is provided with the usual pair of upright guides or standards 17 and 18.

The side discharge wagon box assembly of this invention, designated generally at 19, includes a longitudinally extended base frame 21 of a rectangular shape, a box mounting frame 22 extended transversely of and pivotally connected to the base frame for transverse tilting movement, and a wagon box 23 secured to the frame 21.

The base frame 21 extends between and is supported on the bolsters 14 and 16. As appears in FIG. 2 the base frame is of a width less than the transverse distance between associated pairs of standards 17 and 18 and has the side 24 thereof positioned against the standards 18. Suitable spacer members 26 are located between the standards 17 and the side 27 of the base frame 22 to hold the frame against transverse movement relative to the bolsters 14 and 16. It is seen, therefore, that the longitudinal axis of the base frame 21 is offset to one side of the transverse centers of the bolsters 14 and 16 with its side 27 arranged closer to such transverse centers than the side 24 by a distance equal to the length of the spacers 26. In one embodiment of the invention the standards 17 and 18 are transversely spaced apart a distance of thirty-eight inches, with the spacers having a length of six inches.

The box mounting frame 22 (FIG. 2) is of a flat generally arrow head shape in plan view and includes a truncated triangular section 28 that is integrally formed with a rectangular section 29 arranged normal to the base side 31 of the triangular section 28 and having one end projected outwardly therefrom. A plurality of brace members 32 extend between and are connected to the truncated side 33 of the triangular section 28 and the outer end 34 of the rectangular section 29.

The mounting frame 22 extends transversely of the base frame 21 in resting engagement on the top side and intermediate the ends thereof as clearly shown in FIG. 3, with a transverse length substantially equal to the transverse distance between the outer sides of the wagon wheels 12 and 13. Tubular bearings 36 on the lower surfaces of the side members 37 of the triangular section 28 coact with corresponding tubular bearings 38 adjacent the upper surface of the side 27 of the base frame 21 to receive pivot pins 39 (FIG. 1). The mounting frame 22 is thus pivotally connected to the base frame 21 for pivotal tilting movement from a horizontal position (FIG. 3), supported on the base frame, to a transversely tilted position wherein the truncated end 33 thereof is lowermost (FIG. 4).

The box 23 (FIG. 2) is of a rectangular shape in plan view and includes a flat upright rectangular shaped side wall 42 and an opposite upright side wall 43 of a truncated triangular shape, having the truncated end 44 thereof lowermost (FIGS. 1 and 2). Upright end walls 46 (FIG. 2) are each of a truncated triangular shape with their truncated ends 47 secured to opposite ends of the side wall 43 and their base ends 48 secured to opposite ends of the side wall 42. As shown in FIGS. 2 and 6 the lower portion of the side wall 43 is formed with a discharge opening 49 that is provided with a vertically movable door or cover 51.

A bottom wall 52 for the wagon box 23 (FIG. 2) is of an irregular shape formed from a single piece of a flat rectangular shaped sheet metal material so as to include a horizontal body section 53 and upturned opposite end sections or wings 54. The body section 53 is of a truncated triangular shape having a truncated end 56 of a length substantially equal to the length of the truncated end 44 of the side wall 43. Also, the distance between the truncated end 56 of the body section 53 and the base end 57 thereof is substantially equal to the length of the mounting frame 22 transversely of the wagon 10.

The base side 58 of each inclined end section 54 is coincident with an equal in length to the adjacent side of the center body section 53 so that such base sides 58 are in a converging relation extended between the truncated and base ends 56 and 57, respectively, of the center body section 53. Likewise, the upturned angle of inclination of the end sections 54 provides for their sides 59 being extended normal to the base end 57 of the center body section 53 and located substantially in the vertical planes of their associated end walls 46. The sides 61 of the end sections 54 project upwardly from the truncated end 56 of the center body section 53 in substantially the vertical plane of the side wall 43. It is to be noted also that the angle of convergence of the base sides 58 of the end sections 54 corresponds to the angle of convergence of the sides 37 of the triangular section 28 of the mounting frame 22 relative to its truncated side 33 so that such side 33 is substantially equal in length to the truncated end 56 of the bottom wall center section 53.

In one embodiment of the invention the bottom wall 52 is formed from a flat metal sheet material ten feet long and six feet wide with the truncated end 56 of the bottom wall center section 53 being two feet long and with the end sections 54 bent upwardly at angles of about forty-five degrees relative to the plane of the center section 53.

In the assembly of the box 23 the lower edge of the box side wall 42 (FIG. 2) is secured directly to the base side 57 of the center section 53. The lower end of each end wall 46 of the wagon box terminates in an inwardly bent flange 62 for overlapping engagement with the underside of an adjacent inclined end section 54 along its side 59. In a like manner the sides 63 of the side wall 43 terminate in inwardly bent flanges 64 for overlapping engagement with the under surface of an adjacent side 61 of an end section 54.

The assembled box 23 is then secured to the top of the mounting frame 22 with the discharge opening 49 in the side wall 43 located at the truncated end 33 of the triangular section 28 and the base side 58 of the inclined end sections 54, which sides define the junctions of the bottom wall center section 53 with the end sections 54, extended along the sides 37 of the triangular section 28. When thus arranged the central portion of the base side 57 of the center section 53 is located at and extends along the end 34 of the rectangular section 29 of the mounting frame 22. As best appears in FIGS. 1 and 3 the box 23 thus covers the horizontal area defined by the wagon wheels 12 and 13.

For tilting the wagon box 23 and its mounting frame 22 relative to the base frame 21 transversely of the wagon 10 there is provided a hydraulic cylinder assembly 66 (FIG. 1), located at the front end of the wagon 10 and extended transversely thereof. The assembly 66 is of double acting type and includes a cylinder 67 and associated piston having a retractable and extensible piston rod 68.

The cylinder assembly 66 (FIG. 1) is interconnected with the wagon box 23 and the mounting frame 22 by an upright frame unit 69 of a generally tripod construction that is located below the front end section 54 of the wagon box bottom wall 52 and includes a first leg member 71 attached at its upper end to the under side of the front left hand corner 72 of the box 23. The lower end of the leg member 71 is pivotally connected at 73 to the side 27 of the base frame 21 in axial alignment with the pivot pins 39 for the mounting frame 22. A second upright leg member 74 has one end secured to the front end of the side 34 of the rectangular section 29 of the mounting frame 22 with its upper end connected adjacent the top end of the first leg member 71. A third leg member 76 of the tripod frame unit 69 is arranged opposite the first leg member 71 and is secured to the underside of the front end section 54 of the wagon box bottom wall 52 so as to extend from the mounting frame 22 to a position adjacent the upper end of the first leg member 71.

The hydraulic cylinder assembly 66 (FIGS. 1 and 3) has the closed end of its cylinder 67 pivotally connected at 77 to the forward end of the side 24 of the base frame 21 for pivotal movement about an axis parallel to the axes of the wagon box pivots 39 and 73. The free end of the piston rod 68 is connected to a pivot pin 79 that projects forwardly from an upright connecting leg 81 located in a transverse plane of base frame 21 with its top end secured to the front end section 54 of the box bottom wall 52 at a position intermediate the front side 59 thereof. The lower end of the connecting leg 81 is secured to the lower end of the first leg member 71. A brace member 82 extended along the under side of the front end section 54 is connected to the second leg member 74 and to the upper end of the connecting leg 81.

The under side of the rear end section 54 of the wagon box bottom wall 52 (FIG. 5) is provided with a brace member 83 secured at its lower end to the mounting frame 22. An upright pivot arm structure 84 is connected to the brace member 83 with its lower end pivotally mounted at 86 to the side 27 of the base frame 21, with the pivot 86 in axial alignment with the pivots 39 and 73.

When the piston rod 68 is retracted within the cylinder 67 the wagon box 23 is in the horizontal loading position shown in FIGS 1 and 3. When the cylinder assembly 66 is removed from the wagon 10 the box 23 may be secured in its loading position by a locking arm 87 pivoted at 88 to the front end 89 of the base frame 21 and formed at its free end with a hole 91 for releasable attachment with a pin 92 projected forwardly from the under side of the front end section 54 of the wagon box bottom wall 52. On extension of the piston rod 68 the box 23 is tilted about the pivots 39, 73 and 86 to its unloading position shown in FIG. 4 wherein the mounting frame 22 is tilted at an angle of about thirty degrees relative to the horizontal plane of the base frame 21.

By virtue of the construction of the box bottom wall 52, this angular tilting of the box 23 provides for the center section 52 and end sections 54 of the bottom wall being inclined downwardly towards the discharge opening 49. The bottom wall 52 thus functions as a chute to provide for the movement of all material within the box downwardly and outwardly therefrom through the discharge opening 49. As a result of this free flow of material from the box 23 any tamping of the box 23 to dislodge material therefrom, such as by striking against the box or by repeated operation of the cylinder assembly 66 to move the box to a tilted position with a jarring action, is completely eliminated.

Oil under pressure is supplied to the cylinder assembly 66 through conduits 93 from a hydraulic pump assembly (not shown) carried on the tractor unit for towing the wagon 10. The cylinder assembly may be of a usually available type found on farm equipment and in one embodiment of the invention has a bore of three inches and a stroke of eight inches.

Due to the rigid construction of the box mounting frame 22 and its interconnection with the cylinder assembly 66 through the tripod frame unit 69 tilting of the box 23 takes place with little torsional or twisting stress being applied to the mounting frame 21 and in turn to the box 23. As a result the need for a plurality of lifting cylinders 66 is eliminated.

The discharge opening 49 in the box side wall 43 (FIGS. 1 and 6) is opened and closed by the door 51 which is guidably supported for vertical movement by guideways 96 carried on the outer surface of the side wall 43. Secured to the outer surface of the door 51 is a vertically extended rack bar 97 adapted for meshing engagement with a pinion 98 mounted on a control shaft 99 extended longitudinally along the outside of the side wall 43. The forward end of the shaft 99 is equipped with a hand crank 101. A friction brake unit, indicated generally at 102, is supported from the first leg member 71 of the tripod frame 69 in operative association with the shaft 99. The brake unit 102 functions to lock the shaft 99 against rotation for any moved position of the door 51.

A discharge chute (FIGS. 1 and 6) is pivotally mounted at 103 on the box side wall 43 for movement from a storage position extended upwardly against the door 51, shown in full lines in FIG. 6, to a lowered position, shown in dotted lines, extended outwardly from the bottom of the discharge opening 49 to direct material therefrom into a feed trough, a conveyor or the like.

Although the invention has been described with respect to a preferred embodiment thereof, it is to be understood that it is not to be so limited since changes can be made therein which are within the full intended scope of the invention as defined in the appended claims.

I claim:

1. A side discharge wagon box assembly for a farm wagon chassis having front and rear axle and wheel assemblies comprising:
   (a) a horizontal base frame extended longitudinally of said chassis and carried on said axle and wheel assemblies,
   (b) a wagon box,
   (c) a flat mounting frame for said wagon box having a first section of a substantially triangular shape with a truncated apex portion and a second projected outwardly from the central portion of the base side of said first section, said frame extended transversely of and overlying said base frame between said axle and wheel assemblies with the apex portion of said first section at one side of the wagon chassis,
   (d) coacting means on said first section and on the side of the base frame adjacent said one side of the wagon chassis pivotally connecting said mounting frame on said base frame for pivotal movement transversely of said base frame,
   (e) said wagon box including a bottom wall having a horizontal central section of a triangular shape with a truncated apex portion and upturned side sections each of a triangular shape with a base portion coextensive in length with a corresponding adjacent side portion of the central section,
   (f) said wagon box having a first side wall of a rectangular shape connected to and extended upwardly normal to the base side of said central section, and a second side wall of an inverted triangular shape with a truncated apex portion having a discharge opening therein, said second side wall extended vertically with the end portions thereof secured to adjacent side portions of said upturned sections, and the apex portion thereof located opposite the apex portion of said bottom wall, and
   (g) end walls for said wagon box vertically extended between and connected to the adjacent ends of said side walls and adjacent side portions of said upturned sections, whereby on pivoted movement of said mounting frame to tip downwardly the apex portion thereof, the central section and upturned sections of said bottom wall are inclined downwardly toward said discharge opening.

2. A side discharge dump wagon comprising:
   (a) a horizontal frame unit having front wheels and rear wheels,
   (b) a wagon box,
   (c) a horizontal supporting frame for said wagon box extended transversely of said frame unit between said front and rear wheels,
   (d) said wagon box having a bottom wall arranged within the horizontal area defined by said front and rear wheels, said bottom wall including a horizontal central section of a triangular shape with a base portion and a truncated apex portion, and a pair of upturned side sections of a triangular shape, each having a base side coextensive with an adjacent side of the central section,
   (e) each upturned section having a first side lying in a vertical plane common to said truncated apex portion, and a second side extended normal to the base portion of said central section,
   (f) said wagon box having a first side wall extended vertically upwardly from the base portion of said central section, a second side wall extended vertically upwardly from said truncated apex portion and the first sides of said upturned sections, and end walls extended vertically upwardly from the second sides of said upturned sections, said second wall having a discharge opening therein located at said truncated apex portion, and
   (g) coacting means on said supporting frame and on one side of the frame unit pivotally mounting the supporting frame for pivotal movement transversely of the frame unit from a first horizontal position overlying said frame unit to a second position wherein said truncated apex portion of the bottom wall is lowermost,
   (h) said central section and side sections of the bottom wall in said second position of the supporting frame, having the top surfaces thereof inclined downwardly toward said truncated apex portion.

3. A side discharge wagon box assembly for a horizontal portable frame unit comprising:
   (a) a wagon box,
   (b) a flat mounting frame for said wagon box,
   (c) means pivotally connecting said mounting frame with said frame unit for pivotal movement from a first horizontal position in resting engagement on the top side of said frame unit to a second position tilted transversely of said frame unit,
   (d) said wagon box having a horizontal bottom wall formed with a center section of a truncated triangular shape, and a pair of upturned triangular sections each of which has a base side coextensive with an adjacent side of said bottom wall,
   (e) a pair of end walls for said wagon box, each of which extends vertically from one of the sides of said upturned sections,
   (f) a first side wall extended vertically from the base side of said center section,
   (g) a second side wall extended vertically from the truncated side of the bottom wall, and from the second one of the sides of said upturned sections, said second side wall having a discharge opening extended upwardly from said truncated side, (h) said opening being lowermost and said bottom wall and upturned sections being inclined downwardly toward said opening when said mounting frame is in the second position therefor.

4. A side discharge wagon box assembly for a portable frame unit having front and rear ground engaging wheels and transversely extended supporting axles therefor, comprising:
   (a) a wagon box of a rectangular shape having vertically extended side walls and end walls,
   (b) a mounting frame for said wagon box extended transversely of said frame unit with the end portions thereof projected laterally outwardly from said frame unit between said front and rear wheels,
   (c) a bottom wall for said wagon box including a horizontal central body portion extended transversely of said frame unit and upturned triangular shaped front and rear end portions having the lower base sides thereof extended transversely from the terminal ends of one side of said body portion in a converging relation to the opposite side of said body portion, and the apices of said front and rear end portions located at the longitudinally spaced corners of the wagon box at said opposite side of the central body portion,
   (d) said bottom wall having a width substantially coextensive with the dimension of the mounting frame transversely of said frame unit, and a length corresponding substantially to the longitudinal spacing between said front and rear axles, and
   (e) coacting means on said mounting frame and on the side of the frame unit adjacent said opposite side of the central body portion for pivotally supporting the mounting frame for pivotal movement transversely of the frame unit from a first horizontal position in resting engagement on the frame unit to a second tilted position wherein said opposite side of the central body portion is lowermost,
   (f) with the side wall at said opposite side of the central body portion of said bottom wall having a discharge opening at the lower end thereof located between said base sides of the front and rear end portions of the bottom wall.

References Cited

UNITED STATES PATENTS

| | | | |
|---|---|---|---|
| 343,011 | 6/1886 | Conkle | 298—18 |
| 681,927 | 9/1901 | Pharis | 298—17.6 X |
| 2,573,293 | 10/1951 | Zuber | 298—7 |
| 3,083,057 | 3/1963 | Kiser | 298—7 |
| 3,318,486 | 5/1967 | Felix | 298—24 X |
| 3,412,883 | 11/1968 | Birdsall | 298—24 X |

RICHARD J. JOHNSON, Primary Examiner